US007783700B2

(12) United States Patent
Kawazoe et al.

(10) Patent No.: US 7,783,700 B2
(45) Date of Patent: Aug. 24, 2010

(54) SERVER APPARATUS, SCREEN SHARING METHOD AND COMPUTER READABLE MEDIUM

(75) Inventors: Hiroshi Kawazoe, Yokohama (JP); Masataka Goto, Yokohama (JP); Shinya Murai, Kawasaki (JP); Kensaku Yamaguchi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 339 days.

(21) Appl. No.: 11/819,653

(22) Filed: Jun. 28, 2007

(65) Prior Publication Data

US 2008/0095151 A1 Apr. 24, 2008

(30) Foreign Application Priority Data

Oct. 24, 2006 (JP) .............................. 2006-288749

(51) Int. Cl.
 *G06F 15/16* (2006.01)
(52) U.S. Cl. ..................................................... 709/203
(58) Field of Classification Search ........................ None
 See application file for complete search history.

(56) References Cited

U.S. PATENT DOCUMENTS

| 4,422,171 A * | 12/1983 | Wortley et al. ............... 714/748 |
| 2003/0072382 A1 * | 4/2003 | Raleigh et al. ............... 375/267 |
| 2003/0103450 A1 * | 6/2003 | Chapman et al. ............. 370/229 |
| 2003/0120802 A1 * | 6/2003 | Kohno ......................... 709/237 |
| 2004/0125110 A1 * | 7/2004 | Kohda et al. ................. 345/501 |
| 2007/0064705 A1 * | 3/2007 | Tateno et al. ................. 370/394 |

FOREIGN PATENT DOCUMENTS

| JP | 2004-048545 | 2/2004 |
| JP | 2004-048546 | 2/2004 |
| JP | 2005-020590 | 1/2005 |

OTHER PUBLICATIONS

U.S. Appl. No. 11/790,685, filed Apr. 26, 2007.
Richardson et al.: "The RFB Protocol", http:virtuallab.tu-freiberg. de/p2p/documentation/vnc/html/rfbproto.pdf), ORL Cambridge, Version 3.3, pp. 1-26, Jan. 1998.
Office Action in Japanese Application No. 2006-288749, dated May 20, 2008 and English-language translation thereof.

\* cited by examiner

*Primary Examiner*—Hong Cho
*Assistant Examiner*—Ajay P Cattungal
(74) *Attorney, Agent, or Firm*—Nixon & Vanderhye, PC

(57) ABSTRACT

There is provided with a method of performing in a server apparatus sharing an image to be displayed on a screen with a client terminal, including: updating a part of an image in a frame buffer; generating a first packet which includes first area information indicating a first area updated in the image, a first image which is an image after update in the first area and a sequence number assigned by a sequence number counter and transmitting it; storing a set of the first area information and the sequence number in a storage; receiving a retransmission request including a sequence number from the client terminal; detecting a second area which is not updated in the first image which corresponds to the sequence number included in the retransmission request after the transmission of the first image by referring to the storage; acquiring a second image in the second area from the frame buffer.

21 Claims, 12 Drawing Sheets

| Seq | Left | Top | Right | Bottom |
|-----|------|-----|-------|--------|
| 0 | 320 | 80 | 640 | 240 |
| 1 | 240 | 160 | 480 | 320 |
| 2 | 160 | 240 | 400 | 400 |
| 3 | 160 | 160 | 320 | 320 |

1030

RETRANSMISSION AREA
INFORMATION =
{
  {
    Left = 320,
    Top = 80,
    Right = 640,
    Bottom = 240,
  }
  ,
  {
    Left = 400,
    Top = 240,
    Right = 480,
    Bottom = 320
  }
}

SERVER APPARATUS, SCREEN SHARING METHOD AND COMPUTER READABLE MEDIUM

CROSS-REFERENCE TO RELATED APPLICATIONS

This application is based upon and claims the benefit of priority from the prior Japanese Patent Applications No. 2006-288749 filed on Oct. 24, 2006, the entire contents of which are incorporated herein by reference.

BACKGROUND OF THE INVENTION

1. Field of the Invention

The present invention relates to a server apparatus, a screen sharing method and a computer readable medium for sharing an image displayed on a screen with a client terminal.

2. Related Art

There is a "screen sharing system" which packetizes a desktop image of a server apparatus and delivers them from the server apparatus to a client terminal connected through a network in real time. According to this system, it is possible for both users remote from each other to share and refer to a desktop image on one side and realize an efficient cooperative work environment between both points via a network.

When building a screen sharing system, there are methods like a method whereby drawing contents of a whole desktop area of a server apparatus are packetized at predetermined time intervals and delivered to a client terminal and a method whereby every time a drawing area in a desktop area is updated, only the updated part is packetized together with drawing coordinates thereof and delivered. According to the latter method of delivering a difference, only data of necessary parts is generated according to a change of drawing contents, and therefore there are such advantages that it is possible not only to use network bands more efficiently than the former method but also to increase the number of drawing frames per unit time. Therefore, in currently provided screen sharing systems, services are often provided in a configuration whereby only difference data is delivered.

In a screen sharing system, some of image packets transmitted from a server apparatus to a client terminal may be lost, and therefore it is essential to perform control so as to minimize the influence in such a case. For this reason, a communication control protocol having a function of retransmitting lost packets represented by TCP (Transmission Control Protocol) is generally used. As for such a retransmission function, the server apparatus transmits an image packet with a sequence number indicating a temporal sequence assigned thereto, while the client terminal monitors the sequence number included in the received packet and detects that a loss has occurred in the reception of the image packet. Upon detecting the loss of the packet, the client terminal transmits a retransmission requesting packet including the corresponding sequence number to the server apparatus and the server apparatus which has received this packet searches a list of image packets already transmitted in the past stored in the own storage area, selects and extracts a packet corresponding to the sequence number and retransmits this packet to the client terminal.

However, this method involves a problem that there is possibility that the amount of data of the retransmission packet transmitted to the client terminal from the server apparatus may unnecessarily grow. That is, when an area which corresponds to the retransmission request from the client terminal is overwritten and updated with another image through an immediately following update, even if a retransmission packet is sent, the drawing is overwritten immediately with a subsequent image at the client terminal. Such a situation is estimated to possibly occur in a case where updates are frequently performed in a specific area, for example, when video contents are reproduced on the desktop.

Furthermore, the server apparatus needs to store a history of transmission image packets in the past for a long time to generate a retransmission packet. This may drastically tighten a storage area necessary for storage of the history.

Incidentally, JP-A 2005-20590 (Kokai) points out, as a problem, that the above described screen sharing system compromises realtimeness and proposes, as a countermeasure for this, that when the client terminal does not receive a packet that should be received following the packet received last time even after a lapse of an allowable time interval, the client terminal should send a retransmission request to the server apparatus.

SUMMARY OF THE INVENTION

According to an aspect of the present invention, there is provided with a server apparatus which shares an image to be displayed on a screen with a client terminal, comprising:

a frame buffer configured to store the image to be displayed on the screen;

a display control unit configured to display the image in the frame buffer on the screen;

an update processing unit configured to update a part of the image in the frame buffer;

a sequence number counter configured to generate a sequence number to be given to each packet;

a first transmission unit configured to generate a first packet which includes first area information indicating a first area updated in the image, a first image which is an image after update in the first area and a sequence number assigned by the sequence number counter and transmit the first packet to the client terminal;

a transmission history storage unit configured to store a set of the first area information and the sequence number;

a retransmission request reception unit configured to receive a retransmission request including a sequence number from the client terminal;

a retransmission image generation unit configured to detect a second area which is not updated in the first image which corresponds to the sequence number included in the retransmission request after the transmission of the first image by referring to the transmission history storage unit and acquire a second image in the second area from the frame buffer; and a second transmission unit configured to generate a second packet including second area information indicating the second area, the second image and a sequence number assigned from the sequence number counter, transmit the second packet to the client terminal and request the transmission history storage unit to store a set of the second area information and same sequence number as that included in the second packet.

According to an aspect of the present invention, there is provided with a screen sharing method of performing in a server apparatus sharing an image to be displayed on a screen with a client terminal, comprising:

storing the image to be displayed on the screen in a frame buffer;

displaying the image in the frame buffer on the screen;

updating a part of the image in the frame buffer;

generating a first packet which includes first area information indicating a first area updated in the image, a first image which is an image after update in the first area and a sequence number assigned by a sequence number counter;

transmitting the first packet to the client terminal;

storing a set of the first area information and the sequence number in a transmission history storage unit;

receiving a retransmission request including a sequence number from the client terminal;

detecting a second area which is not updated in the first image which corresponds to the sequence number included in the retransmission request after the transmission of the first image by referring to the transmission history storage unit;

acquiring a second image in the second area from the frame buffer;

generating a second packet including second area information indicating the second area, the second image and a sequence number assigned from the sequence number counter;

transmitting the second packet to the client terminal; and storing a set of the second area information and same sequence number as that included in the second packet in the transmission history storage unit.

According to an aspect of the present invention, there is provided with a computer readable medium storing a computer program for causing a computer sharing an image to be displayed on a screen with a client terminal, to execute instructions to perform steps of:

storing the image to be displayed on the screen in a frame buffer;

displaying the image in the frame buffer on the screen;

updating a part of the image in the frame buffer;

generating a first packet which includes first area information indicating a first area updated in the image, a first image which is an image after update in the first area and a sequence number assigned by a sequence number counter;

transmitting the first packet to the client terminal;

storing a set of the first area information and the sequence number in a transmission history storage unit;

receiving a retransmission request including a sequence number from the client terminal;

detecting a second area which is not updated in the first image which corresponds to the sequence number included in the retransmission request after the transmission of the first image by referring to the transmission history storage unit;

acquiring a second image in the second area as a second image from the frame buffer;

generating a second packet including second area information indicating the second area, the second image and a sequence number assigned from the sequence number counter;

transmitting the second packet to the client terminal; and storing a set of the second area information and same sequence number as that included in the second packet in the transmission history storage unit.

DETAILED DESCRIPTION OF THE INVENTION

Hereafter, an embodiment of the present invention will be described more specifically with reference to the attached drawings.

Figure 1:
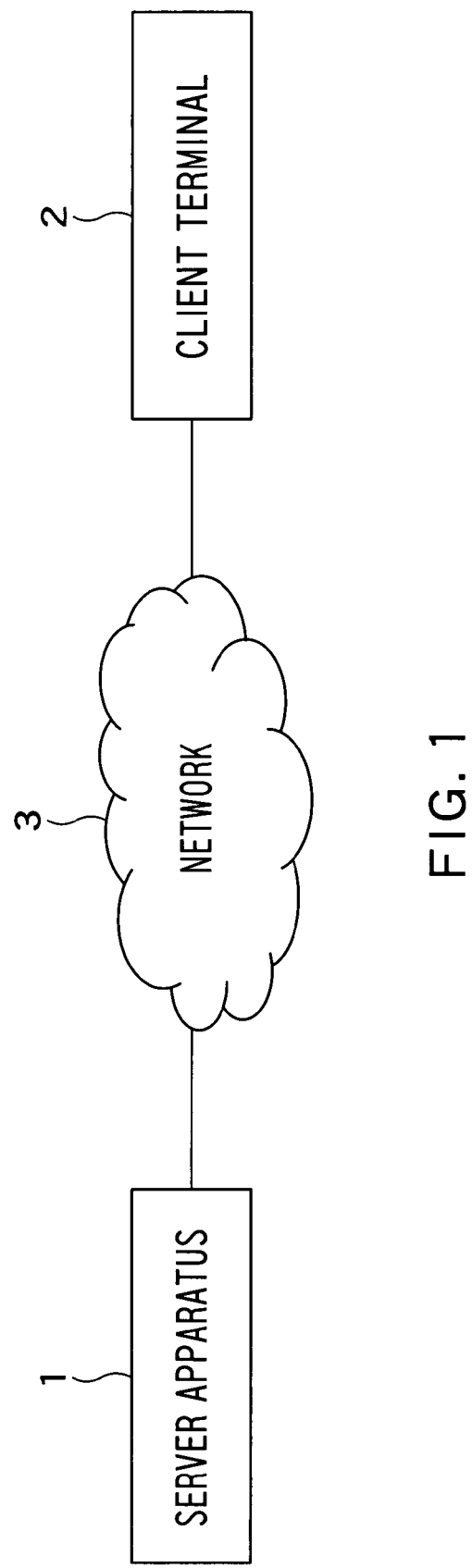
FIG. 1 shows the configuration of a screen sharing system according to an embodiment of the present invention.

FIG. 1 shows the configuration of a screen sharing system provided with a server apparatus as an embodiment of the present invention. This configuration includes an information processing apparatus (server apparatus) 1 which functions as a server and an information processing terminal (client terminal) 2 which functions as a client connected together via a network 3.

Figure 2:
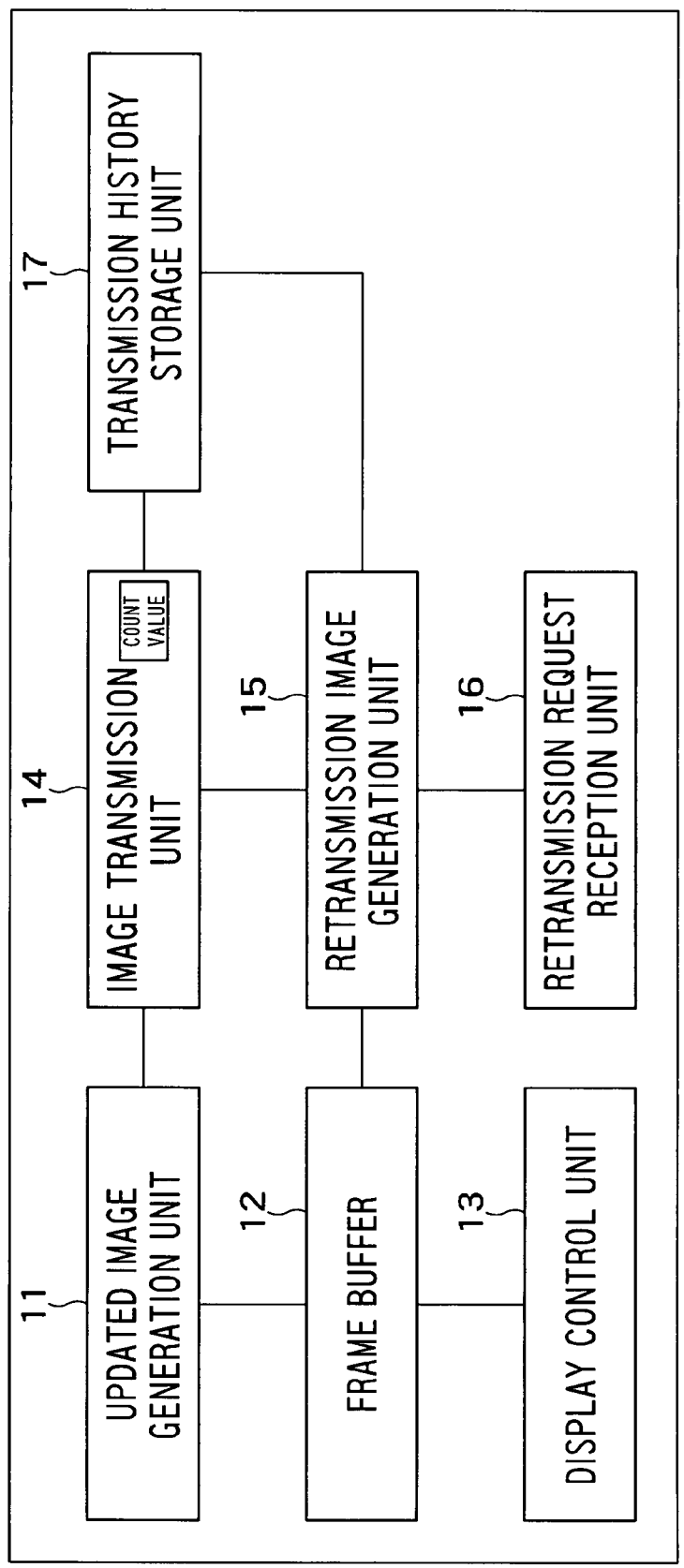
FIG. 2 shows the configuration of a server apparatus.

FIG. 2 schematically shows the configuration of the server apparatus 1.

The server apparatus 1 includes, as components thereof, an updated image generation unit (update processing unit) 11, a frame buffer 12, a display control unit 13, an image transmission unit 14, a retransmission image generation unit 15, a retransmission request reception unit 16 and a transmission history storage unit 17. The image transmission unit 14 includes a first transmission unit, a second transmission unit and a sequence number counter.

The updated image generation unit 11 generates an image after an update (updated image) of an area to be updated on a display screen (desktop) and information indicating the position of the area to be updated (area information) according to the operating condition of an OS (Operating System) and applications that are executed at the server apparatus 1. The updated image is rectangular screen data corresponding to part of a desktop. The updated image corresponds to a first image. The area information is a numerical value indicating the display position of the updated image on the desktop (numerical value indicating the storage position when storing an updated image in the frame buffer 12). This area information corresponds to first area information.

The frame buffer 12 has a storage area to store a whole image of a display screen (screen data corresponding to the whole desktop). The frame buffer 12 stores (overwrites) the updated image generated by the updated image generation unit 11 in an area indicated in the area information generated by the updated image generation unit 11. The frame buffer 12 can output all or part of the screen data stored in itself according to an instruction from outside such as the retransmission image generation unit 15.

The display control unit 13 displays the whole image stored in the frame buffer 12.

The image transmission unit 14 receives the updated image and area information from the updated image generation unit 11, generates an image packet (first packet) including the received updated image, area information and a sequence number indicating the temporal transmission order of the packet and transmits the generated image packet to the client terminal 2 through the network 3. The image transmission unit 14 has a sequence number storage to store sequence number count values and includes the sequence number count value which is stored in the sequence number storage in the above described image packet as a sequence number. The image transmission unit 14 increments the sequence number count value in the sequence number storage by 1 after generating the image packet. That is, the image transmission unit 14 has a sequence number counter which generates a sequence number to be assigned to each packet.

The transmission history storage unit 17 receives the same sequence number and area information as those included in the above described image packet as one set from the image transmission unit 14 and stores it in the own storage area in a list format.

The retransmission request reception unit 16 receives a retransmission request packet including a sequence number from the client terminal 2 through the network 3 and extracts the sequence number from the received retransmission request packet. The retransmission request reception unit 16 hands over the extracted sequence number to the retransmission image generation unit 15.

The retransmission image generation unit 15 acquires the area information corresponding to all sequence numbers from the sequence number handed over from the retransmission request reception unit 16 onward from the transmission history storage unit 17. The retransmission image generation unit 15 acquires an area resulting from excluding the area overlapping with the areas indicated in the area information which corresponds to all sequence numbers newer than the sequence number handed over from the retransmission request reception unit 16 from the area indicated in the area information corresponding to the sequence number as a retransmission area (the area not updated after the transmission of the image corresponding to the sequence number included in the retransmission request packet). The retransmission image generation unit 15 acquires the image in the retransmission area as the retransmission image from the frame buffer 12. This retransmission image corresponds to a second image.

The image transmission unit 14 receives a retransmission image and information indicating the position of the above retransmission area (retransmission area information) from the retransmission image generation unit 15, generates a retransmission image packet (second packet) including the retransmission image, retransmission area information, and sequence number count value in the sequence number storage, transmits the generated retransmission image packet to the client terminal 2 through the network 3. After generating the retransmission image packet, the image transmission unit 14 increments the sequence number count value in the above described sequence number storage by 1. The retransmission area information corresponds to the second area information.

Figure 3:
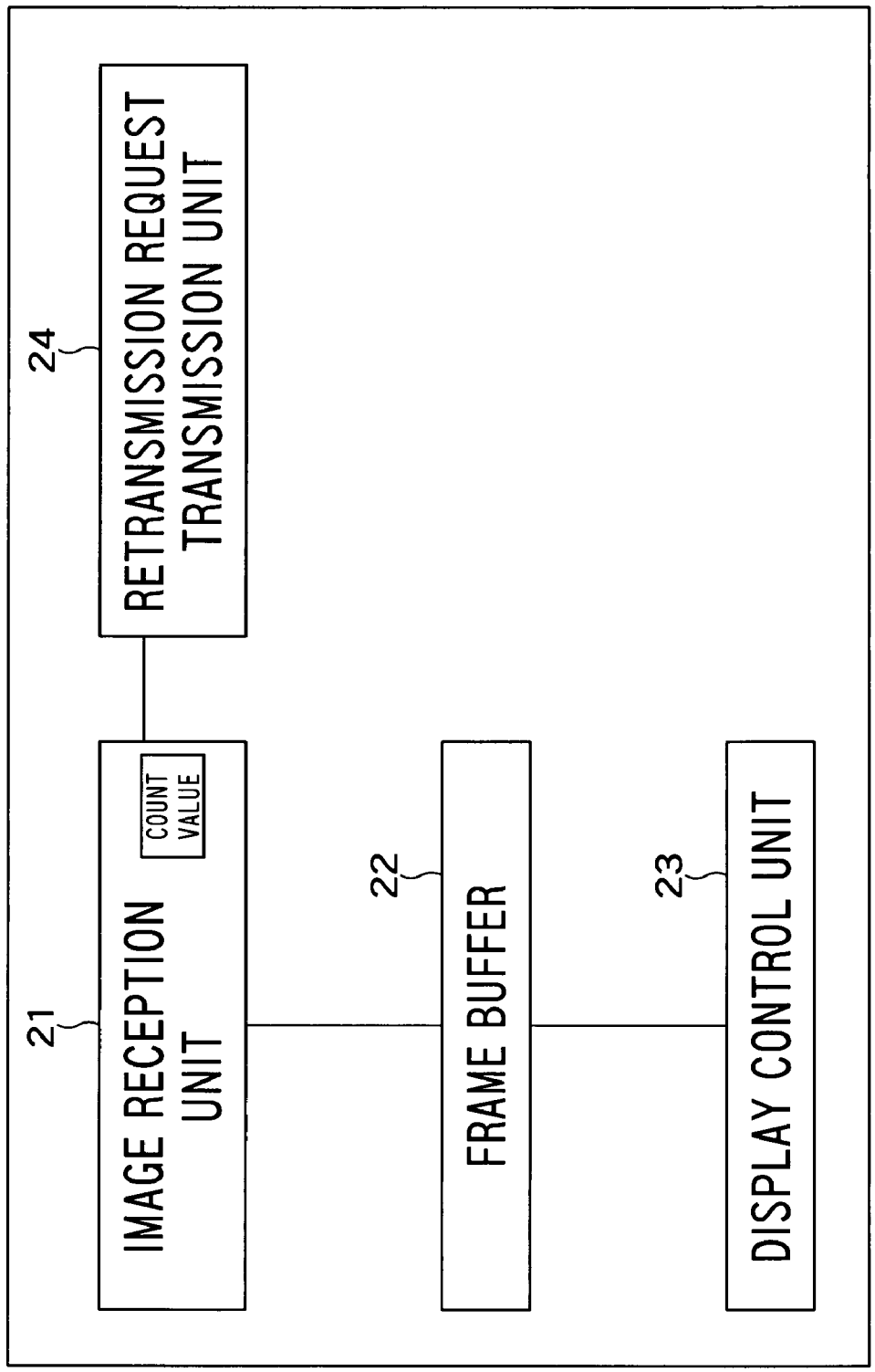
FIG. 3 shows the configuration of a client terminal.

FIG. 3 schematically shows the configuration of the client terminal 2.

The client terminal 2 has an image reception unit 21, a frame buffer 22, a display control unit 23 and a retransmission request transmission unit 24 as components thereof.

The image reception unit 21 extracts an updated image or a retransmission image (generically called a "received image"), area information or retransmission area information (generically called "reception area information") and a sequence number from the image packet or the retransmission image packet (generically called a "received packet") received from the server apparatus 1 through the network 3. Furthermore, the image reception unit 21 has a sequence number storage to store a sequence number count value and judges the necessity for a retransmission based on the sequence number included in the received packet and this sequence number count value. More specifically, when the sequence number included in the received packet matches the sequence number count value, the image reception unit 21 judges that there is no need for any retransmission, and when the sequence number is a newer value than the sequence number count value, the image reception unit 21 judges that there is a need for a retransmission. Suppose, for example, the sequence number count value is 100 and the sequence number is 103. The image reception unit 21 judges that it is necessary to retransmit received packets corresponding to sequence numbers 100, 101 and 102. By handing over the sequence numbers of the received packets which need to be retransmitted to the retransmission request transmission unit 24, the image reception unit 21 instructs the retransmission request transmission unit 24 to send requests for retransmissions of received packets to the server apparatus 1.

Just as with the frame buffer 12 of the server apparatus 1, the frame buffer 22 has a storage area to store a whole image of the display screen (screen data corresponding to the whole desktop). The frame buffer 22 stores the reception image included in the received packet received at the image reception unit 21 in an area indicated in the reception area information included in the received packet.

The display control unit 23 displays the screen data which is stored in the frame buffer 22.

The retransmission request transmission unit 24 generates a retransmission request packet including the sequence number received from the image reception unit 21 and transmits it to the server apparatus 1 through the network 3.

Next, the processing performed by the screen sharing system according to this embodiment will be explained with reference to drawings as appropriate. The server apparatus 1 and the client terminal 2 are connected through the network 3 and suppose that both terminals are conducting screen sharing.

Figure 4:
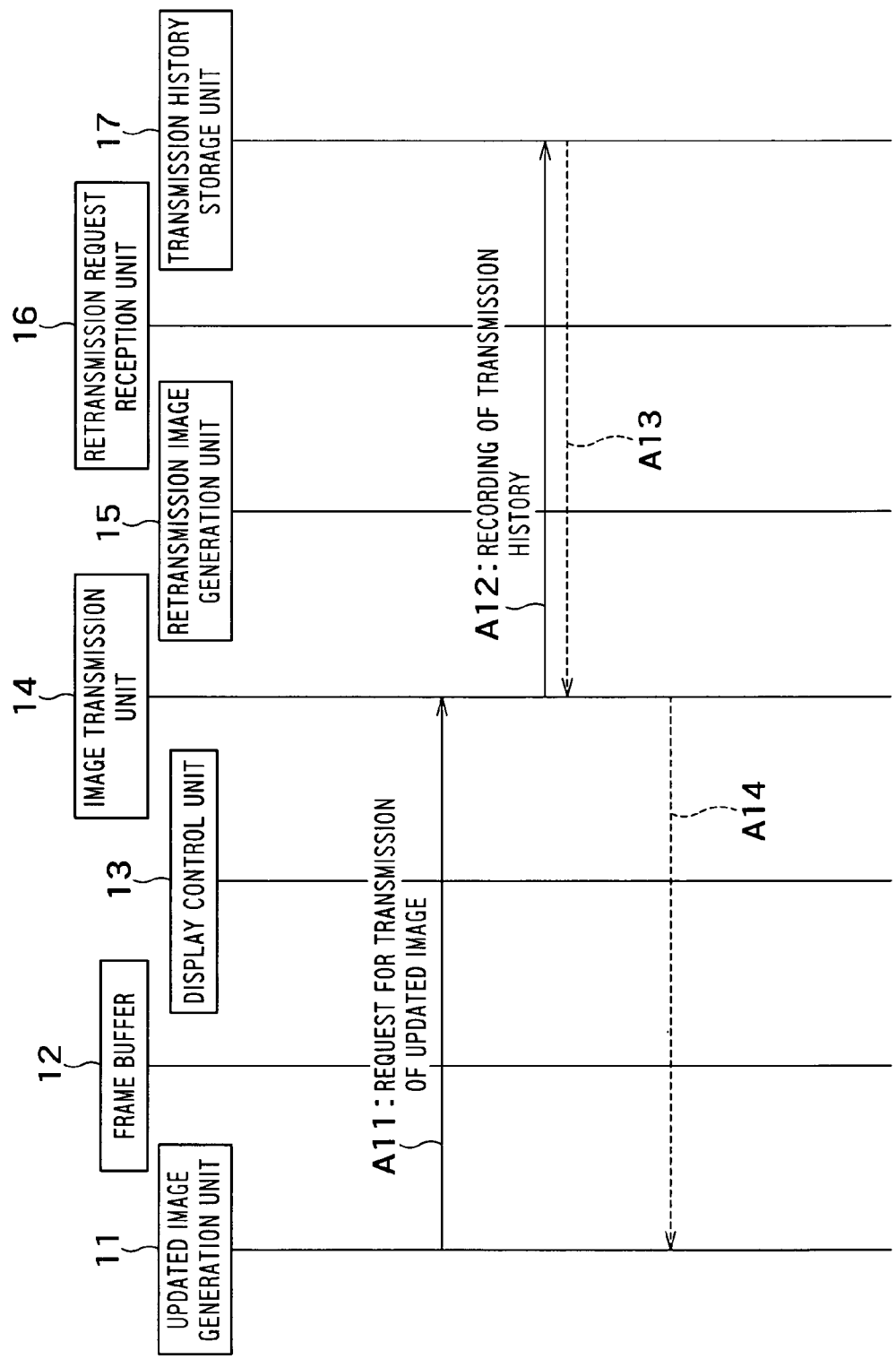
FIG. 4 is a sequence diagram when an updated image is generated at the server apparatus.
Figure 5:
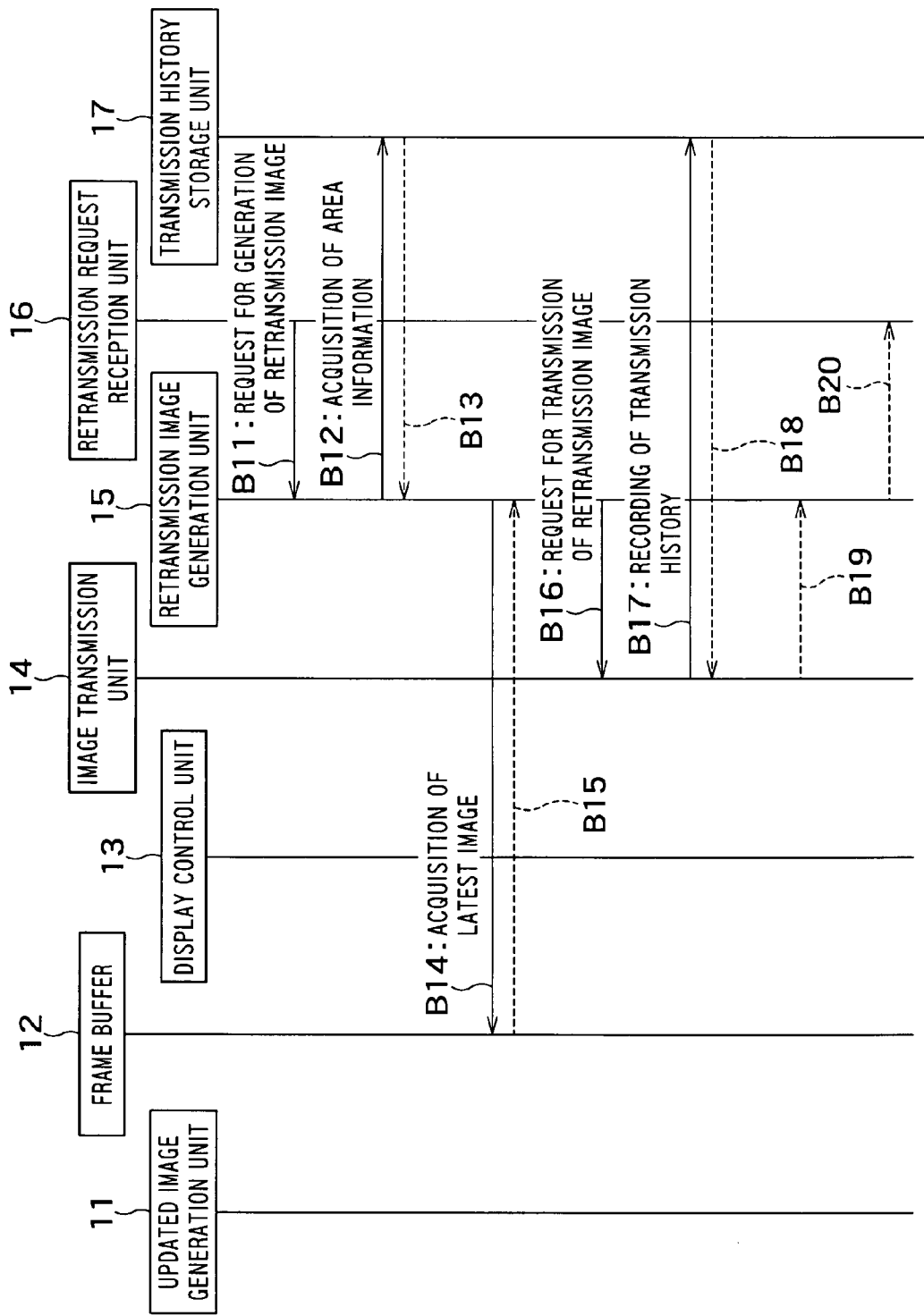
FIG. 5 is a sequence diagram when a retransmission request is received at the server apparatus.
Figure 6:
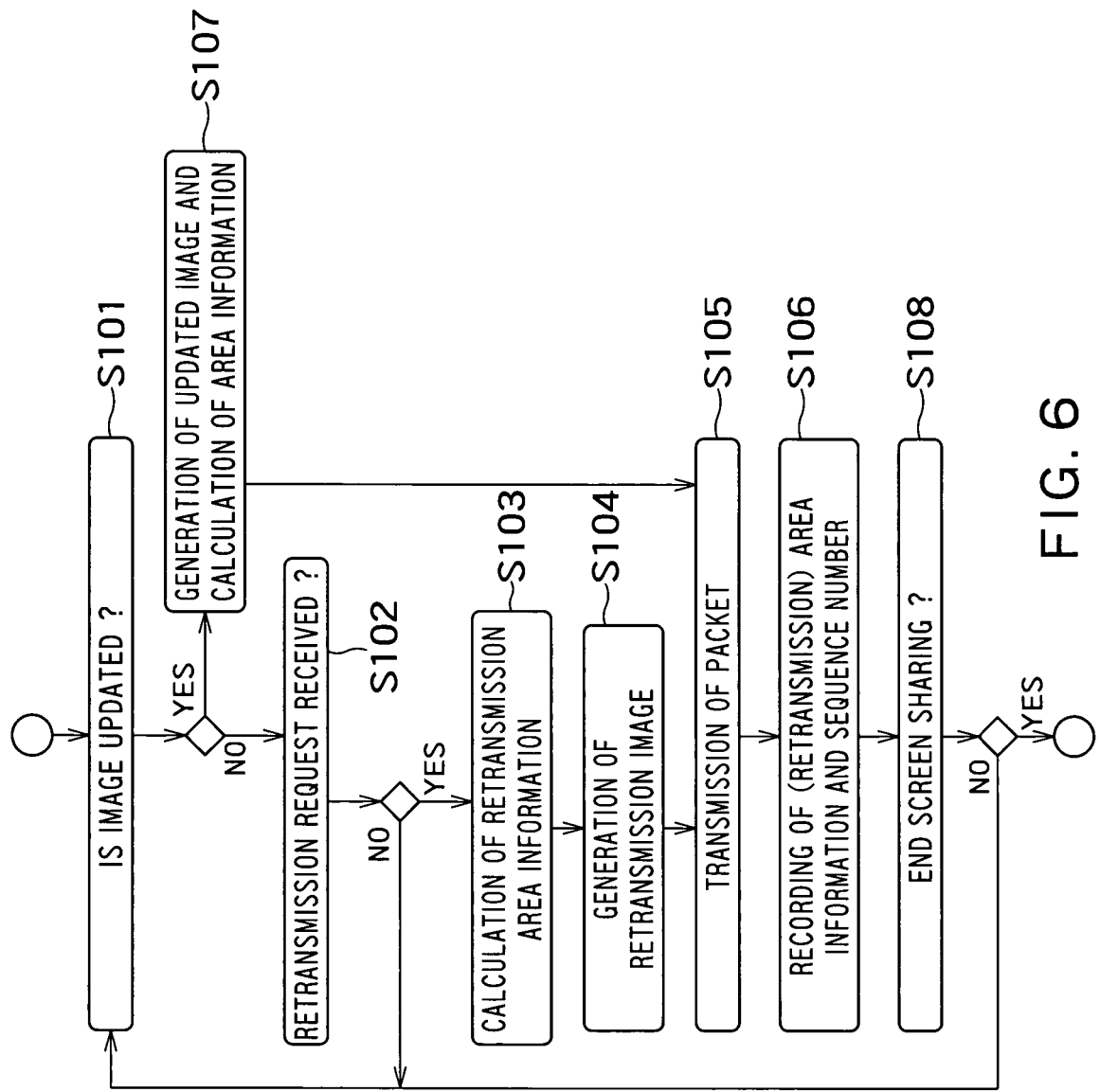
FIG. 6 is a flow chart of the server apparatus.

First, processing performed by the server apparatus 1 will be explained with reference to FIG. 2, FIG. 4, FIG. 5 and FIG. 6. FIG. 4 illustrates a sequence executed when an updated image is generated, FIG. 5 illustrates a sequence executed when a retransmission request is received from the client terminal 2 and FIG. 6 is a flow chart showing a flow of overall processing at the server apparatus 1.

Figure 8:
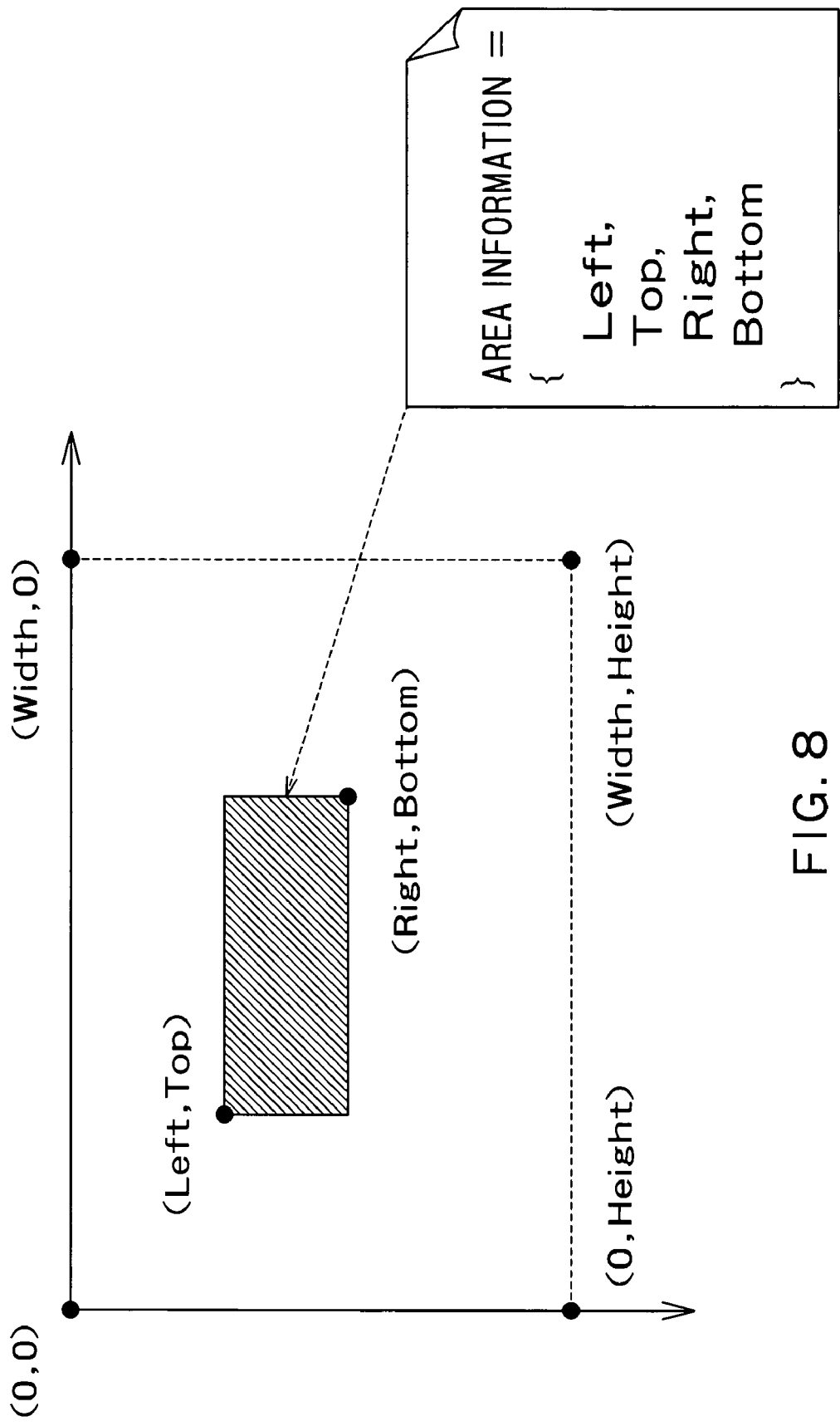
FIG. 8 illustrates area information.

When conducting screen sharing, the updated image generation unit 11 checks to see whether or not there is an update in the visual information to be presented to the user due to a change that takes place in the operating conditions of the OS and applications executed at the server apparatus 1 and generates an updated image when there is an update (YES in S101) (step S107). The updated image refers to rectangular screen data which corresponds to part of the desktop as described above. The updated image generation unit 11 not only generates updated image but also calculates area information of the updated image (step S107). The area information is a numerical value which indicates the display position of the updated image on the desktop as described above. Here, as shown in FIG. 8, suppose the area information is coordinate values (Left, Top) of the top left vertex and coordinate values (Right, Bottom) of the bottom right vertex of the rectangle of the updated image assuming that the top left of the desktop is the origin of the xy coordinates plane, the horizontal width of the desktop is "Width" and the vertical width of the desktop is "Height." The updated image generation unit 11 inputs the generated updated image and the calculated area information to the frame buffer 12. The frame buffer 12 overwrites and updates the area indicated in the area information of the own storage area with the updated image. The display control unit 13 displays the screen data in the frame buffer 12. Furthermore, the updated image generation unit 11 inputs the generated updated image and the calculated area information to the image transmission unit 14 and thereby requests a transmission of the updated image (A11 in FIG. 4). The flow of processing moves to step S105.

In step S105, the image transmission unit 14 which has received the request for a transmission of the updated image refers to the sequence number count value stored in the own sequence number storage and generates an image packet (first packet) including a sequence number, updated image and area information using this sequence number count value as the sequence number. The image transmission unit 14 resets this sequence number count value to zero when screen sharing starts and increments the count value by 1 thereafter every time an image packet is generated in this step S105. When the sequence number count value exceeds a specified value (for example, 2 to the 32nd power−1), the image transmission unit 14 resets the count value to zero again.

The image transmission unit 14 transmits the generated image packet to the client terminal 2 through the network 3. When an image packet is transmitted, the image transmission unit 14 outputs the same area information and the sequence number as those included in the image packet as one set to the transmission history storage unit 17 and requests the transmission history storage unit 17 to record the set (A12 in FIG. 4). The flow of processing moves to step S106.

In step S106, the transmission history storage unit 17 stores the set of the area information and the sequence number input from the image transmission unit 14 in the own storage area. The transmission history storage unit 17 manages each set in a list format and adds the input set to the list. After adding the input set to the list, the transmission history storage unit 17 informs the image transmission unit 14 of the addition (A13 in FIG. 4). Upon receiving the information that the addition to the list has been completed, the image transmission unit 14 informs the updated image generation unit 11 that the image packet has been sent to the client terminal 2 (A14 in FIG. 4).

After this, it is judged whether or not an instruction to end screen sharing is given from the user (S108), and the process ends when the instruction is given (S108 YES) or the process returns to S101 when the instruction is not given (NO in S108).

On the other hand, when the visual information presented to the user is not updated in step S101 (NO in S101), the flow of processing moves to step S102.

In step S102, the retransmission request reception unit 16 confirms whether or not a retransmission request packet from the client terminal 2 has been received through the network 3. When no retransmission request packet has been received (NO in S102), the flow of processing returns to step S101. When a retransmission request packet has been received (YES in S102), the retransmission request reception unit 16 extracts the sequence number included in a payload part of the retransmission request packet. The retransmission request reception unit 16 requests the generation of a retransmission image by inputting the sequence number to the retransmission image generation unit 15 (B11 in FIG. 5). The flow of processing moves to step S103.

In step S103, the retransmission image generation unit 15 which has received a request for generating a retransmission image from the retransmission request reception unit 16 outputs the sequence number input from the retransmission request reception unit 16 to the transmission history storage unit 17 and requests the acquisition of all area information from the sequence number onward (B12 in FIG. 5). In response to this request, the transmission history storage unit 17 searches the own storage area, detects area information included in sets having sequence numbers identical to the input sequence number or newer than this and returns the area information to the retransmission image generation unit 15 (B13 of FIG. 5). Assuming the area information which corresponds to the sequence number input to the transmission history storage unit 17 as "request area information" and the area information which corresponds to the sequence number newer than the sequence number as "transmitted area information", the retransmission image generation unit 15 calculates the area resulting from excluding the area overlapping with the areas indicated in the transmitted area information from the area indicated in the request area information as the retransmission area. Assuming the information indicating this retransmission area as "retransmission area information", the retransmission image generation unit 15 inputs this retransmission area information to the frame buffer 12 and requests the acquisition of the image (latest image) which exists in the retransmission area (B14 in FIG. 5). The method of calculating the retransmission area will be explained in detail later. The flow of processing moves to step S104.

The frame buffer 12 which has received a request for acquiring the latest image from the retransmission image generation unit 15 in step S104 acquires an image of the area indicated in the retransmission area information input from the retransmission image generation unit 15 from the own storage area and returns this to the retransmission image generation unit 15 as the retransmission image (B15 in FIG. 5). The retransmission image generation unit 15 inputs the received retransmission image and retransmission area information to the image transmission unit 14 to thereby request the transmission of the retransmission image (B16 in FIG. 5). When the number of sets of the retransmission image and the retransmission area information is more than one, transmission requests are sent one by one in appropriate order. The flow of processing moves to step S105.

In step S105, the image transmission unit 14 which has received the request for the transmission of the retransmission image refers to the sequence number count value stored in the own storage area and generates a retransmission image packet (second packet) including this sequence number count value, retransmission image and retransmission area information. The image transmission unit 14 transmits the retransmission image packet to the client terminal 2 through the network 3. After transmitting the retransmission image packet, the image transmission unit 14 outputs a set of the retransmission area information and sequence number to the transmission history storage unit 17 and requests the recording of this set (B17 in FIG. 5). The flow of processing moves to step S106. When the retransmission area information indicates an area of zero, the image transmission unit 14 may end this step S105 without generating any retransmission image packet, and further omit next step S106.

In step S106, the transmission history storage unit 17 stores the set of the retransmission area information and the sequence number input from the image transmission unit 14 in the own storage area. The transmission history storage unit 17 manages each set in a list format and adds the input set to the list. After adding the set, the transmission history storage unit 17 informs the image transmission unit 14 of the addition (B18 in FIG. 5) and the image transmission unit 14 which has received this information informs the retransmission image generation unit 15 that the retransmission image packet has been transmitted to the client terminal 2 (B19 in FIG. 5). The retransmission image generation unit 15 which has received this information returns the information that a retransmission image has been generated to the retransmission request reception unit 16 (B20 in FIG. 5).

After this, it is judged whether or not an instruction to end screen sharing has been given from the user (S108), and the processing ends when the instruction has been given (YES in S107) or the process returns to S101 when the instruction has not been given (NO in S108).

Figure 7:
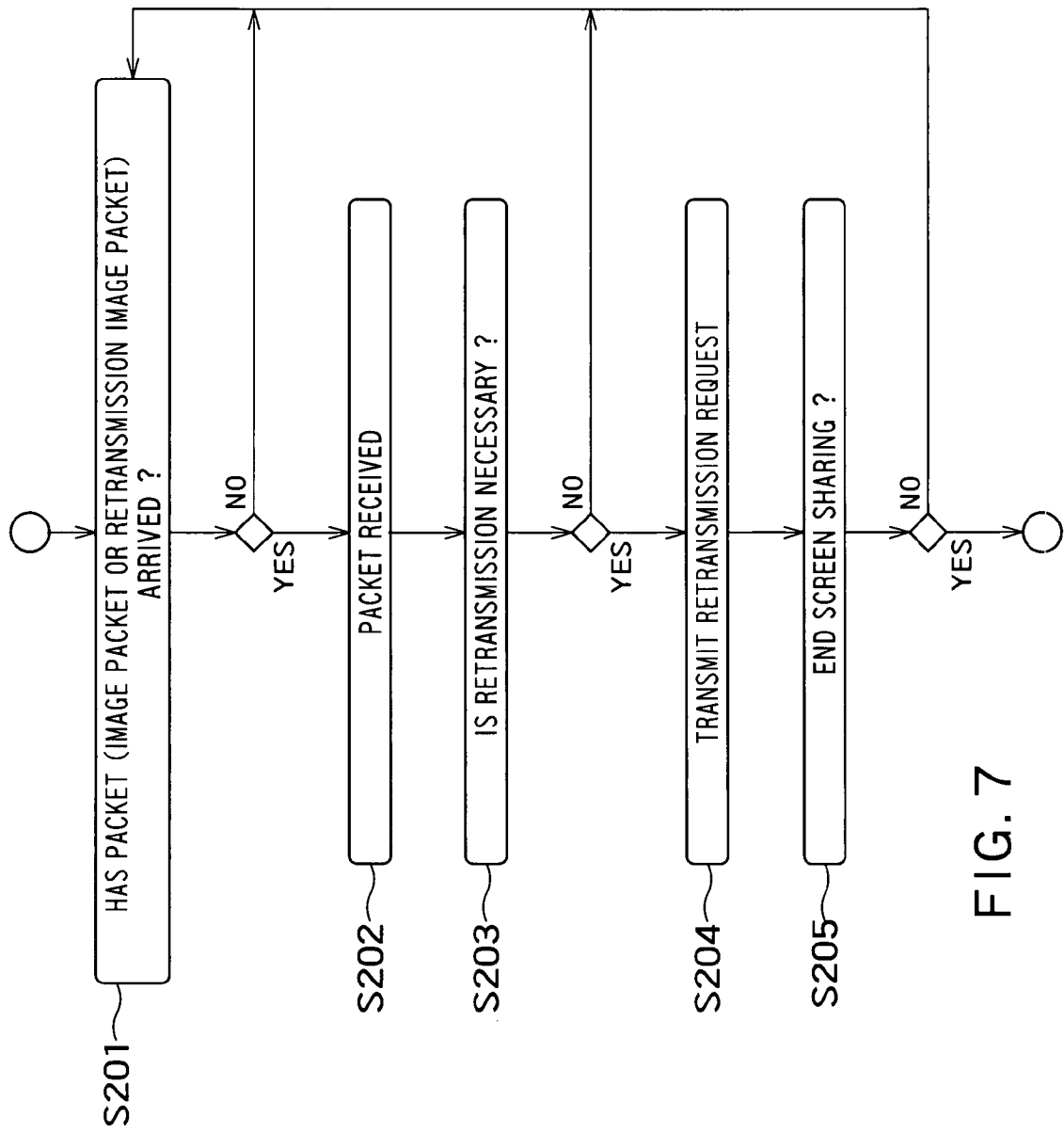
FIG. 7 is a flow chart of the client terminal.

Next, the processing at the client terminal 2 of this screen sharing system will be explained with reference to FIG. 3 and FIG. 7. FIG. 7 is a flow chart showing a flow of processing at the client terminal 2.

In step S201, the image reception unit 21 of the client terminal 2 which is conducting screen sharing with the server apparatus 1 confirms whether or not an image packet or a retransmission image packet (generically called a "received packet") has arrived at a reception buffer (not shown) from the server apparatus 1 through the network 3. When the received packet has arrived (YES in S201), the flow of processing moves to step S202. When the received packet has not arrived (NO in S201), the processing in this step is repeatedly performed until the arrival of the received packet can be confirmed.

In step S202, the image reception unit 21 extracts a received packet from the reception buffer and extracts the updated image or the retransmission image (generically called a "received image"), area information or retransmission area information (generically called "reception area information") and sequence number included in the payload part of the received packet. The image reception unit 21 inputs the extracted received image and the extracted reception area information to the frame buffer 22. When the received image and reception area information are input from the image reception unit 21, the frame buffer 22 overwrites and updates the area indicated in the reception area information of the own storage area with the received image. The frame buffer 22 outputs the image of the stored desktop screen to the display control unit 23 and the display control unit 23 displays the image. The flow of processing moves to step S203.

In step S203, the image reception unit 21 judges whether or not it is necessary to request a retransmission based on the sequence number extracted from the received packet. More specifically, the image reception unit 21 refers to the sequence number count value stored in the own sequence number count value storage and examines whether or not the extracted sequence number matches this sequence number count value. In the case of a match, the image reception unit 21 judges that there is no need for a retransmission request (NO in S203).

In the case of a mismatch and when the extracted sequence number is newer than the sequence number count value, the image reception unit 21 judges that a retransmission request is necessary (YES in S203). Suppose, for example, the sequence number count value is 100 and the sequence number is 103. The image reception unit 21 judges that the received packets corresponding to sequence numbers 100, 101 and 102 have been lost and judges that it is necessary to request the retransmission of these packets. On the other hand, when the sequence number is older than the sequence number count value (e.g., 98), the image reception unit 21 judges that the received packet which arrived before has arrived redundantly and discards the received packet (judges that there is no need for a retransmission request).

When the sequence number and the sequence number count value match, the image reception unit 21 increments the sequence number count value by 1. That is, the image reception unit 21 updates the sequence number count value to a value resulting from adding 1 to the sequence number. Furthermore, when the sequence number is newer than the sequence number count value, the sequence number count value is also updated with the value resulting from adding 1 to the sequence number. When, for example, the sequence number count value is 100 and the sequence number is 103, the sequence number count value is updated to 104 (=103+1). The sequence number count value is reset to zero when screen sharing starts and is reset to zero again when the sequence number count value exceeds a specified value (the same as the specified value of the sequence number count value of the image transmission unit 14 in the server apparatus 1).

When the retransmission request is judged to be necessary above (YES in S203), the flow of processing moves to step S204 and when the retransmission request is judged to be unnecessary (NO in S203), the flow of processing returns to step S201.

In step S204, the image reception unit 21 inputs the sequence number of a received packet for which a retransmission request needs to be sent to the retransmission request transmission unit 24 and thereby instructs the transmission of a retransmission request to the server apparatus 1. The retransmission request transmission unit 24 generates a retransmission request packet including the input sequence number and transmits it to the server apparatus 1 through the network 3. When the number of received packets for which a retransmission request is sent is more than one, one retransmission request packet may include all the corresponding sequence numbers or a plurality of retransmission request packets may be generated. When the transmission of the retransmission request packet is completed, it is judged whether or not an instruction to end screen sharing has been given from the user (S205), and the processing ends when the instruction has been given (YES in S205) or the flow of processing returns to step S201 when the instruction has not been given (NO in S205).

Figure 10:
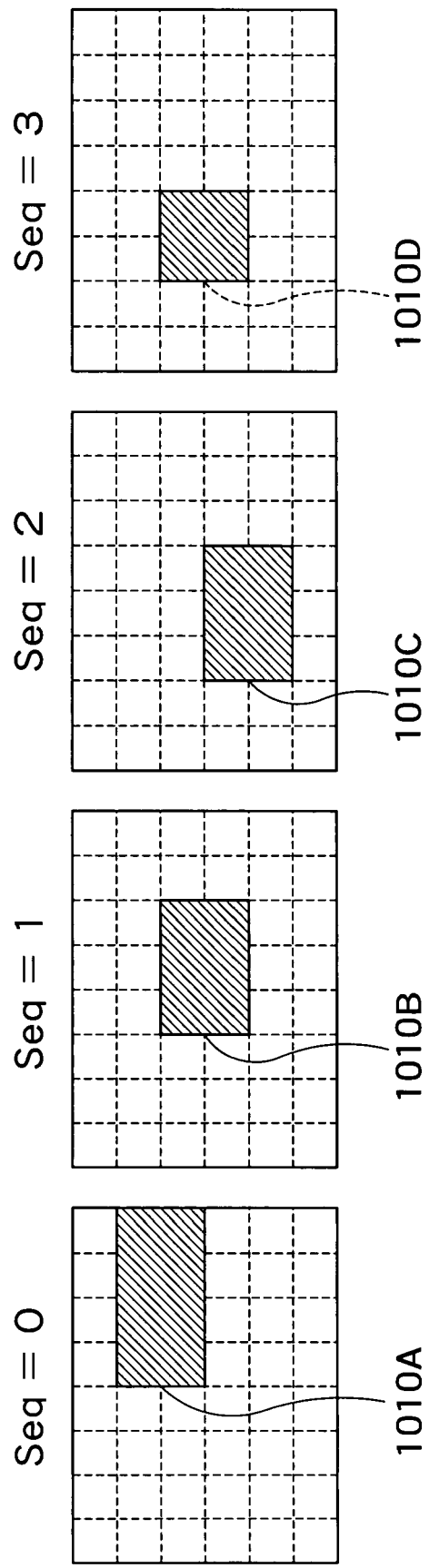
FIG. 10 shows examples of area information included in an image packet.
Figure 11:
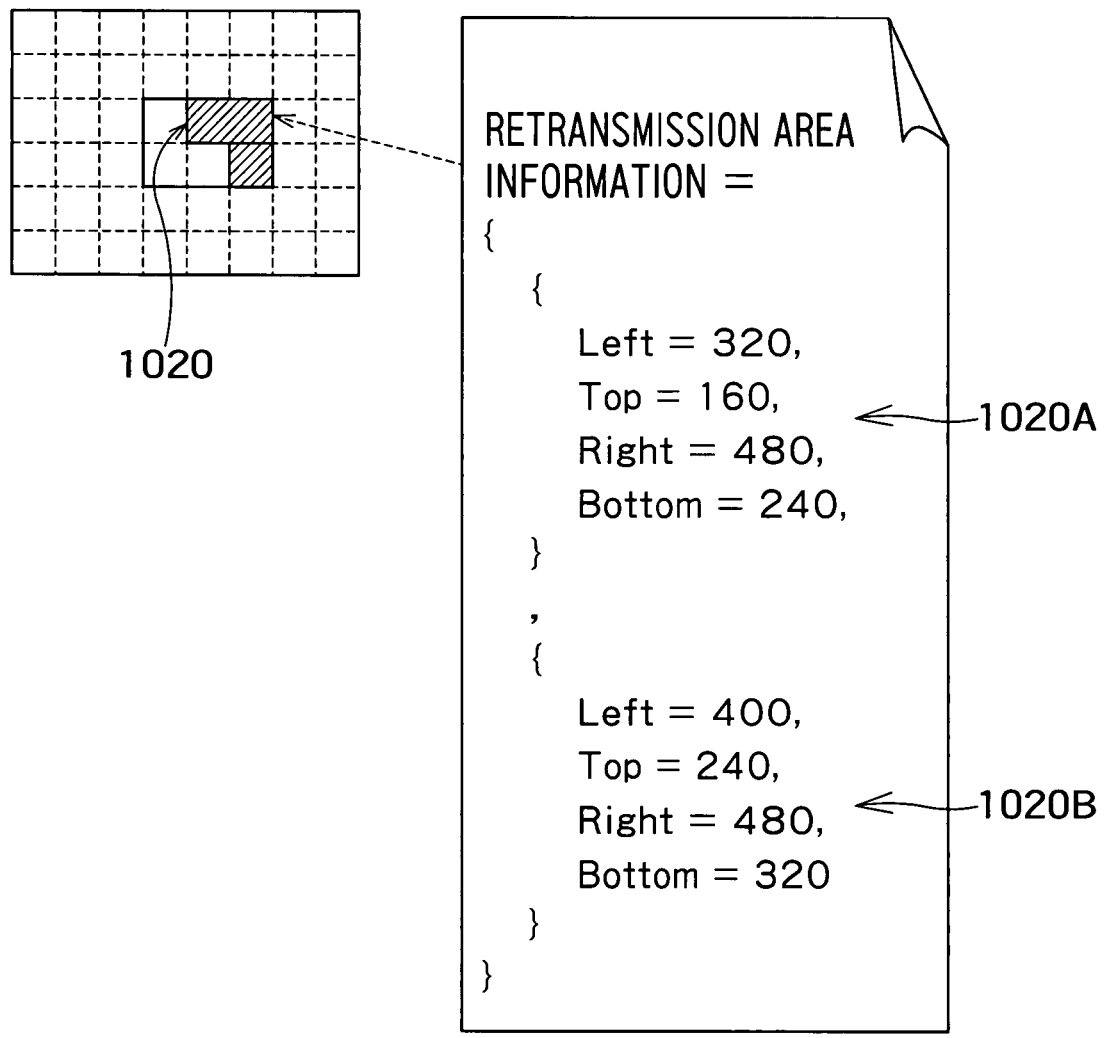
FIG. 11 shows an example of retransmission area information.

Here, the details of the calculation processing of the retransmission area information carried out in step S103 in FIG. 6 will be explained here with reference to FIG. 9, FIG. 10 and FIG. 11 with specific examples.

Figure 9:
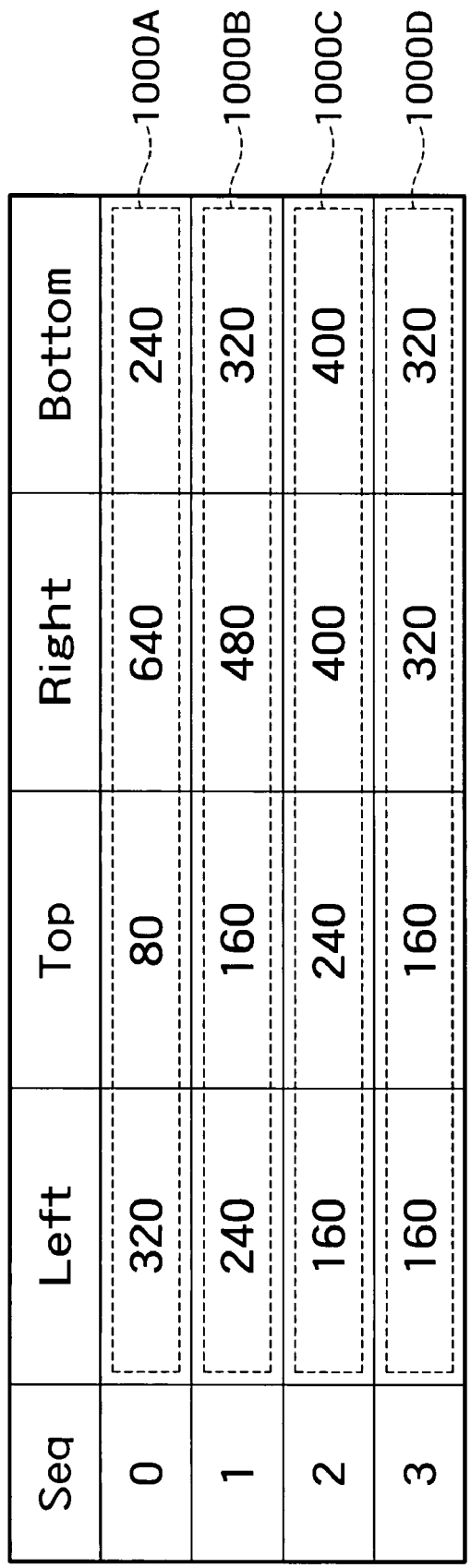
FIG. 9 shows examples of area information included in an image packet.

FIG. 9 shows examples of the set of the area information and the sequence number included in four image packets transmitted from the server apparatus 1 to the client terminal 2 respectively. In these examples, it is assumed that the width of the desktop (Width) is 640, vertical width (Height) is 480. Furthermore, the sequence number starts with 0 and in this example, area information 1000A, 1000B, 1000C and 1000D from 0 to 3 are shown. FIG. 10 illustrates areas expressed by these. The server apparatus 1 transmits image packets in ascending order of sequence numbers and stores these pieces of area information and sequence numbers in the transmission history storage unit 17.

Here, the processing in the case where the image packet of sequence number 1 is lost on the network 3 will be described. Suppose the image reception unit 21 of the client terminal 2 has already completed the reception of the image packet which corresponds to sequence number 0 and the sequence number count value which is stored in the storage area of the image reception unit 21 is 1. At this time, suppose the sequence number included in the image packet which is newly received by the image reception unit 21 is 2. As a result of comparing the sequence number count value with the corresponding sequence number according to the procedure in step S203, the image reception unit 21 judges that the packet of sequence number 1 has been lost and judges that it is necessary to transmit a retransmission request. As a result, the retransmission request transmission unit 24 generates a retransmission request packet including sequence number 1 and transmits it to the server apparatus 1.

Upon receiving sequence number 1 included in the retransmission request packet through the retransmission request reception unit 16, the retransmission image generation unit 15 of the server apparatus 1 inputs this to the transmission history storage unit 17. The transmission history storage unit 17 refers to the storage information and outputs the area information 1000B which corresponds to sequence number 1 and area information 1000C, 1000D which corresponds to sequence numbers that is newer than this, that is, sequence numbers 2, 3 as a response.

Next, the retransmission image generation unit 15 assumes the area information 1000B as "request area information" and area information 1000C, 1000D as "transmitted area information." The retransmission image generation unit 15 then calculates the result of excluding the part overlapping with the transmitted area information from the area indicated in the request area information as the retransmission area. That is, the retransmission image generation unit 15 carries out a calculation which cuts the area overlapping with the area information 1000C, 1000D from the area of the area information 1000B and obtains the retransmission area 1020 shown in FIG. 11 as a result. The retransmission image generation unit 15 assumes the information indicating this retransmission area 1020 as "retransmission area information." The retransmission area 1020 can be expressed as the sum of a plurality of rectangular areas. In the example in FIG. 11, the information can be expressed as the sum of two rectangular areas 1020A and 1020B. Next, the retransmission image generation unit 15 inputs the retransmission area 1020 to the frame buffer 12 and acquires an image (latest image) which corresponds to this retransmission area 1020.

In step S106 in FIG. 6, as described above, the processing of storing a set of the area information and sequence number in the transmission history storage unit 17 in a list format is performed. In this processing, the set of the newly input area information and sequence number is added to the tail end of the list and the set once stored always remains stored until the screen sharing ends. Therefore, since the information of the list increases endlessly, there is a possibility that the storage area at the transmission history storage unit 17 may be exhausted sooner or later. It is possible to use the following method as a method for handling this problem.

The first method is a method of erasing the information of the list in appropriate timing. The retransmission image generation unit 15 sets a timer to an appropriate time every time it newly requests the transmission history storage unit 17 to store a set and deletes the corresponding set from the list at timing notified from the timer at the set time. According to this method, there is a possibility that the set corresponding to the sequence number specified from the client terminal 2 may have been deleted when a retransmission request packet is received, but such an event can be avoided by taking a sufficiently long timer setting time. In the case where a retransmission request packet corresponding to a deleted sequence number is received, the transmission history storage unit 17 informs the retransmission image generation unit 15 that there exists no set that has this sequence number, and upon receiving this information, the retransmission image generation unit 15 may give up the retransmission and may not generate any retransmission image packet. Using the above described method, it is possible to suppress the amount of information in the transmission history storage unit 17 relatively easily.

As the second method, it is also possible to use a method whereby the client terminal 2 informs the server apparatus 1 of the sequence number count value stored in the image reception unit 21 at periodic timing. In this case, the retransmission image generation unit 15 of the server apparatus 1 can regard the value resulting from decrementing the notified sequence number count value by 1 as the sequence number of the packet which the client terminal 2 has successfully received most recently. Therefore, sequence numbers older than this value are regarded as having already been received by the client terminal 2 and it is judged that the set which has these old sequence numbers are no longer necessary and the transmission history storage unit 17 is requested to erase these sets. It is possible to suppress the amount of information in the transmission history storage unit 17 using the above described method, too.

The explanation of step S204 in FIG. 7 here has described that when the number of received packets (image packets or retransmission image packets) whose retransmission is requested is more than one, the client terminal 2 may include sequence numbers that correspond to all the retransmission request packets in one retransmission request packet. Correspondingly, when the number of sequence numbers included in the retransmission request packet is more than one, the server apparatus 1 may also generate one retransmission image packet for a plurality of sequence numbers instead of individually generating retransmission image packets for a plurality of sequence numbers. An example thereof will be explained using FIG. 9 and FIG. 10.

Suppose that the client terminal 2 has failed to receive image packets which correspond to sequence numbers 0 and 1. At this time, the image reception unit 21 sends a retransmission request to the server apparatus 1 about sequence numbers 0 and 1 through the retransmission request transmission unit 24. In response to this, the retransmission image generation unit 15 in the server apparatus 1 generates one retransmission image packet corresponding to both sequence numbers 0 and 1 as follows.

The retransmission image generation unit 15 outputs sequence numbers 0 and 1 to the transmission history storage unit 17 and acquires the area information from sequence number 0 onward from the transmission history storage unit 17. Upon receiving area information from sequence number 0 onward, the retransmission image generation unit 15 assumes the area information corresponding to sequence numbers 0 and 1 as "requested area information" and the area information corresponding to sequence numbers newer than that (which correspond to sequence numbers 2 and 3 here) as "transmitted area information" and then carries out the following processing.

Figure 12:
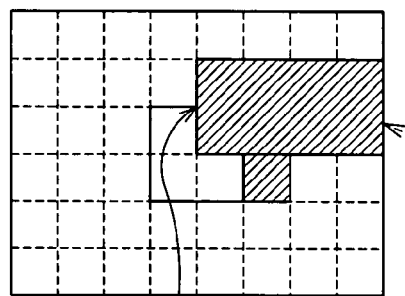
FIG. 12 shows another example of retransmission area information.

First, after calculating the sum (logical sum) of areas indicated in all request area information, the result obtained by excluding an area overlapping with the transmitted area information from the calculated sum area is calculated as a retransmission area and the information indicating this is assumed as "retransmission area information." An example of this retransmission area information is shown in FIG. 12. Reference numeral 1030 denotes a retransmission area. After this, the retransmission image generation unit 15 inputs the retransmission area information to the frame buffer 12, acquires an image (latest image) which corresponds to the retransmission area and transmits the acquired latest image to the server apparatus 1 through the image transmission unit 14. Using the above described method, it is possible to save time and trouble of transmitting overlapping areas with sequence numbers 0 and 1 twice and reduce the amount of communication band used.

As shown above, according to this embodiment, the server apparatus stores a set of the area information and the sequence number included in the image packet transmitted in the past as a history and calculates, when a retransmission request is received, the area resulting from excluding an area overlapping with areas indicated in the area information corresponding to all sequence numbers newer than a sequence number whose retransmission is requested from the area indicated in the area information corresponding to the sequence number as a retransmission area and acquires an image in the retransmission area from the frame buffer and transmits the image. In this way, the server apparatus can reduce the amount of data for retransmission, no longer needs to separately store images included in image packets transmitted in the past and thereby reduce the storage area. The present invention is also easily applicable to a situation in which load on the communication band in the server apparatus is likely to increase as in a case where a desktop screen is delivered based on a multicast scheme or the like and it is possible to expect that the present invention will exert its effects to the full.

What is claimed is:

1. A server apparatus which shares an image to be displayed on a screen with a client terminal, comprising:
- a frame buffer configured to store the image to be displayed on the screen;
- an update processing unit configured to update a part of the image in the frame buffer;
- a sequence number counter configured to generate a sequence number to be given to each of a plurality of packets;
- a first transmission unit configured to generate a first packet which includes first area information indicating a first area updated in the image, a first image which is an image after update in the first area, and a sequence number assigned by the sequence number counter, and to transmit the first packet to the client terminal;
- a transmission history storage unit configured to store a set of the first area information and the sequence number;
- a retransmission request reception unit configured to receive a retransmission request including a sequence number from the client terminal;
- a retransmission image generation unit configured to detect a second area which has not been updated in the first image corresponding to the sequence number included in the retransmission request after the first image was transmitted by referring to the transmission history storage unit and to acquire a second image in the second area from the frame buffer; and
- a second transmission unit configured to generate a second packet including second area information indicating the second area, the second image, and a sequence number assigned from the sequence number counter, to transmit the second packet to the client terminal and to request the transmission history storage unit to store a set of the second area information and same sequence number as that included in the second packet.

2. The server apparatus according to claim 1, wherein the retransmission image generation unit detects an area resulting from excluding an area overlapping with areas indicated by first area information which correspond to sequence numbers newer than the sequence number included in the retransmission request from the area indicated by the first area information which corresponds to the sequence number included in the retransmission request, as the second area.

3. The server apparatus according to claim 1, wherein the retransmission image generation unit acquires an image of a rectangular area including the second area as the second image from the frame buffer, and
the second transmission unit includes information indicating the rectangular area in the second packet as the second area information.

4. The server apparatus according to claim 1, wherein the retransmission image generation unit divides the second area into a plurality of rectangular areas and acquires images in each divided area from the frame buffer as the second image, and
the second transmission unit generates the second packets which include information indicating each divided area as the second area information.

5. The server apparatus according to claim 1, wherein the transmission history storage unit deletes a set which has been stored for a predetermined time.

6. The server apparatus according to claim 1, wherein the retransmission request reception unit receives a packet including information to specify a sequence number which has already been received by the client terminal from the client terminal, and
the transmission history storage unit deletes sets having an already received sequence number or sequence numbers older than the already received sequence number.

7. The server apparatus according to claim 1, wherein the retransmission request reception unit receives the retransmission request including a plurality of sequence numbers, and
the retransmission image generation unit detects an area which is not updated after transmissions of respective first images corresponding to the plurality of sequence numbers from the sum of the respective first images, as the second area.

8. A screen sharing method of performing in a server apparatus sharing an image to be displayed on a screen with a client terminal, comprising:
- storing the image to be displayed on the screen in a frame buffer;
- updating a part of the image in the frame buffer;
- generating a first packet which includes first area information indicating a first area updated in the image, a first image which is an image after update in the first area, and a sequence number assigned by a sequence number counter;
- transmitting the first packet to the client terminal;
- storing a set of the first area information and the sequence number in a transmission history storage unit;
- receiving a retransmission request including a sequence number from the client terminal;
- detecting a second area which has not been updated in the first image corresponding to the sequence number included in the retransmission request after the first image was transmitted by referring to the transmission history storage unit;
- acquiring a second image in the second area from the frame buffer;
- generating a second packet including second area information indicating the second area, the second image, and a sequence number assigned from the sequence number counter;
- transmitting the second packet to the client terminal; and
- storing a set of the second area information and same sequence number as that included in the second packet in the transmission history storage unit.

9. The method according to claim 8, wherein the detecting a second area includes detecting an area resulting from excluding an area overlapping with areas indicated by first area information which correspond to sequence numbers newer than the sequence number included in the retransmission request from the area indicated by the first area information which corresponds to the sequence number included in the retransmission request, as the second area.

10. The method according to claim 8, wherein the acquiring a second image includes acquiring an image of a rectangular area including the second area as the second image from the frame buffer, and
information indicating the rectangular area is included in the second packet as the second area information.

11. The method according to claim 8, wherein the detecting a second area includes dividing the second area into a plurality of rectangular areas, the acquiring a second image includes acquiring images in each divided area from the frame buffer as the second image, and the generating a second packet includes generating the second packets which include information indicating each divided area as the second area information.

12. The method according to claim 8, further comprising deleting a set which has been stored for a predetermined time from the transmission history storage unit.

13. The method according to claim 8, further comprising receiving a packet including information to specify a sequence number which has already been received by the client terminal from the client terminal, and deleting sets having an already received sequence number or sequence numbers older than the already received sequence number from the transmission history storage unit.

14. The method according to claim 8, wherein the receiving a retransmission request includes receiving the retransmission request including a plurality of sequence numbers, and the detecting a second area includes detecting an area which is not updated after transmissions of respective first images corresponding to the plurality of sequence numbers from the sum of the respective first images, as the second area.

15. A non-transitory computer readable medium storing a computer program for causing a computer sharing an image to be displayed on a screen with a client terminal, to execute instructions to perform steps of:

storing the image to be displayed on the screen in a frame buffer;

updating a part of the image in the frame buffer;

generating a first packet which includes first area information indicating a first area updated in the image, a first image which is an image after update in the first area, and a sequence number assigned by a sequence number counter;

transmitting the first packet to the client terminal;

storing a set of the first area information and the sequence number in a transmission history storage unit;

receiving a retransmission request including a sequence number from the client terminal;

detecting a second area which has not been updated in the first image corresponding to the sequence number included in the retransmission request after the first image was transmitted by referring to the transmission history storage unit;

acquiring a second image in the second area as a second image from the frame buffer;

generating a second packet including second area information indicating the second area, the second image, and a sequence number assigned from the sequence number counter;

transmitting the second packet to the client terminal; and storing a set of the second area information and same sequence number as that included in the second packet in the transmission history storage unit.

16. The medium according to claim 15, wherein the detecting a second area includes detecting an area resulting from excluding an area overlapping with areas indicated by first area information which correspond to sequence numbers newer than the sequence number included in the retransmission request from the area indicated by the first area information which corresponds to the sequence number included in the retransmission request, as the second area.

17. The medium according to claim 15, wherein the acquiring a second image includes acquiring an image of a rectangular area including the second area as the second image from the frame buffer, and information indicating the rectangular area is included in the second packet as the second area information.

18. The medium according to claim 15, wherein the detecting a second area includes dividing the second area into a plurality of rectangular areas, the acquiring a second image includes acquiring images in each divided area from the frame buffer as the second image, and the generating a second packet includes generating the second packets which include information indicating each divided area as the second area information.

19. The medium according to claim 15, further comprising receiving a packet including information to specify a sequence number which has already been received by the client terminal from the client terminal, and deleting sets having an already received sequence number or sequence numbers older than the already received sequence number from the transmission history storage unit.

20. The medium according to claim 15, wherein the receiving a retransmission request includes receiving the retransmission request including a plurality of sequence numbers, and the detecting a second area includes detecting an area which is not updated after transmissions of respective first images corresponding to the plurality of sequence numbers from the sum of the respective first images.

21. A server apparatus for a shared image system, the server apparatus comprising:

a frame buffer configured to store an image corresponding to an image displayed on a client terminal of the shared image system;

a storage unit; and a transmitter, wherein the server apparatus is programmed to update a part of the image stored in the frame buffer in response to software running on the server apparatus; to generate a first packet including first area information identifying a first area of the image corresponding to the part of the image which is updated, image data for the first area, and a sequence number; to provide the first packet to the transmitter for transmission to the client terminal; and to store in the storage unit the first area information and the first packet sequence number, and wherein the server apparatus is further programmed to receive from the client terminal a retransmission request which includes a sequence number corresponding to a packet transmitted subsequent to the first packet; to determine, with reference to the received sequence number and to the first area information and first packet sequence number stored in the storage unit, one or more second areas in the first area each of which corresponds to a part of the image in the first area which has not been updated subsequent to the transmitting of the first packet; to access the frame buffer to obtain image data for the one or more second areas; to generate a second packet including second area information identifying the second areas, the obtained image data, and a sequence number; to provide the second packet to the transmitter for transmission to the client terminal; and to store the second area information and the second packet sequence number in the storage unit.

* * * * *